(No Model.)

L. D. WARREN.
SPOKE SOCKET.

No. 370,432. Patented Sept. 27, 1887.

Witnesses
A. G. Holman
R. H. Chapman

Inventor
L. D. Warren
By Hawes & Chapman
Attorneys.

UNITED STATES PATENT OFFICE.

LEVERETT D. WARREN, OF CHICOPEE, MASSACHUSETTS, ASSIGNOR OF ONE-HALF TO WILLIAM D. MANCHESTER, OF SAME PLACE.

SPOKE-SOCKET.

SPECIFICATION forming part of Letters Patent No. 370,432, dated September 27, 1887.

Application filed December 18, 1886. Serial No. 221,910. (No model.)

*To all whom it may concern:*

Be it known that I, LEVERETT D. WARREN, of Chicopee, in the county of Hampden and Commonwealth of Massachusetts, have invented a new and useful Socket Felly-Plate and Felly-Joint Supporter, of which the following is a specification, reference being had to the accompanying drawings, forming part thereof.

My invention relates to plates for connecting the spokes of a wheel to the felly thereof at the points where the joints of the latter occur, and has for its object to improve the construction of such plates in such manner that while serving to securely hold the meeting ends of the sections of the felly in proper relation to the end of the spoke said plates will also enable the felly to be shortened in resetting the tire without necessitating the boring of new holes for the securing-bolts either in the plate itself or in the felly.

To this end my invention consists in the plate constructed as hereinafter described, and also in the combination of said plate with the spokes and felly of a wheel.

Figure 1:
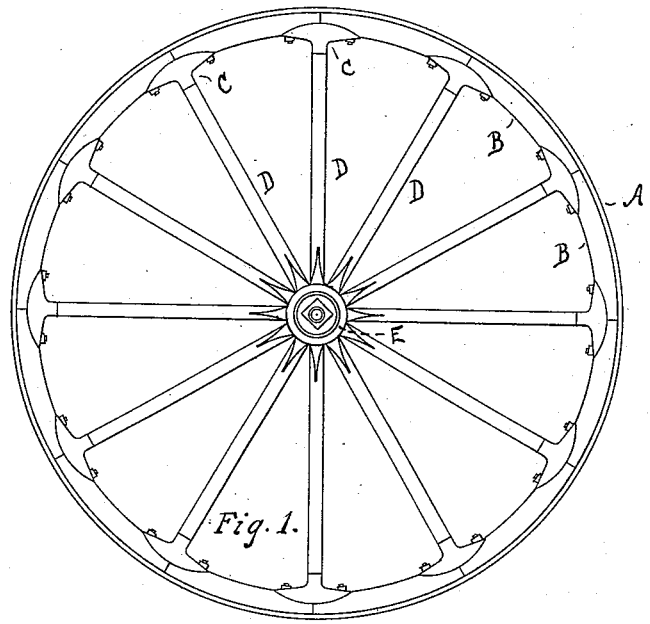
Figure 2:
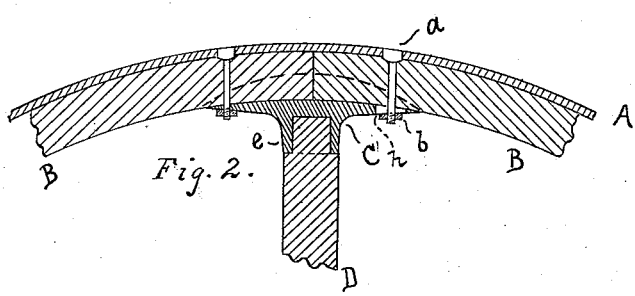
Figure 3:
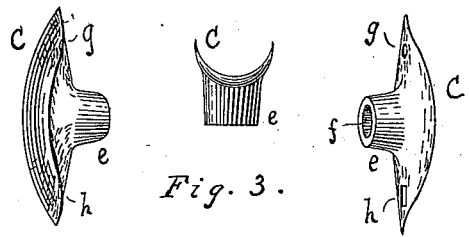

Referring to the drawings, in which like letters designate like parts throughout, Figure 1 is a side elevation of a wheel provided with felly-plates constructed according to my invention. Fig. 2 is an enlarged longitudinal section of a portion of said wheel, showing the manner of securing the plate to the spoke and felly. Fig. 3, in three views, shows the plate detached from the wheel.

The letter A designates the tire, B the felly, D the spokes, and E the hub, of a vehicle-wheel, and C designates the plate devised by me for uniting the spokes to the felly and supporting the joints of the latter. This plate is concavo-convex in cross-section, as shown in Fig. 3, and is curved longitudinally to correspond with the curve of the felly, as shown in Fig. 2. The contour of the concavity in its face will conform to the contour of the felly in cross-section, and the concavity is of sufficient depth to afford a firm support to the felly laterally, as well as inwardly, the sides of the plate preferably extending from end to end thereof in a regular curve, as shown.

Upon the rear or convex side the plate is provided with a hub, $e$, said hub having the bore $f$ to receive the spoke-tenon, as shown in Fig. 2.

It will be observed that the said bore terminates substantially upon a line with the outer edge of the convex side of the plate, thus permitting the thickest part of the plate to rest directly against the end of the spoke. By thus dividing the strain between the end of the spoke and the shoulder thereon, against which the end of the hub $e$ rests, I obviate the tendency of the spoke to split at the shoulder— a common occurrence in wheels having the felly supported entirely upon the shoulder.

The plate is provided upon one side of the hub $e$ with a hole, $g$, to receive one of the bolts $a$, which bolts have their heads countersunk in the tire in the usual manner and extend through the felly and plate, nuts $b$, turned upon their inner ends, securely locking said parts together.

Instead of making a similar hole upon the opposite side of the hub to receive the second bolt $a$, as has been done heretofore, I provide the plate with a slot, $h$, in alignment with the hole $g$ and extending lengthwise of the plate, as shown, by means of which I am enabled to secure the following novel and important function.

It is a well-known fact that whenever it becomes necessary in resetting a tire to cut out a section of the felly it is also necessary to bore a new hole, either in the felly or in the felly-plate, to receive one of the bolts $a$, for the reason that in moving the shortened section of the felly to its new position the old holes are thrown out of alignment. This is objectionable, because if the new holes are bored in the felly they weaken it materially and render it more liable to split, and if made in the felly-plate they disfigure it and detract from the ornamental appearance of the wheel, besides, in either case, consuming much time and labor.

By reference to Fig. 2 it will be observed that the slot $h$ obviates the necessity of boring new holes in either the felly or plate, since by loosening nut $b$ the bolt is permitted to slide bodily with the felly when the latter is shortened, and when the new joint is made the nut is turned down again, locking the parts as securely as before.

The joints of the felly will preferably be provided with the usual dowel-pin. (Not shown.)

The plates will preferably be made from malleable iron, and are designed to be used upon vehicle-wheels generally.

I do not wish to limit myself to the exact contour and relative proportions of the parts shown, as it is obvious that modifications could be made therein without departing from the spirit of my invention.

While I have shown in Fig. 1 a wheel having its felly jointed at the end of each spoke, it will be understood that in light carriage-wheels having but two joints in its felly but two of the socket-plates would be used, the remaining spokes entering the felly in the usual manner.

I claim—

As an article of manufacture, a socket felly-plate and felly-joint supporter, consisting of the plate C, concavo-convex in cross-section, its concavity being of sufficient depth to afford a firm lateral support to the meeting ends of two sections of a felly when placed therein, and the hub $e$, projecting from its convex side, said hub having a smooth bore terminating upon a line with the outer edge of said convex side to form a socket for the end of a spoke, the plate C having hole $g$ upon one side of said hub and having slot $h$ upon the opposite side thereof, substantially as and for the purpose set forth.

LEVERETT D. WARREN.

Witnesses:
W. H. CHAPMAN,
T. M. BROWN.